United States Patent [19]

Howard et al.

[11] Patent Number: 5,020,876

[45] Date of Patent: Jun. 4, 1991

[54] STANDARD REMOTE MANIPULATOR SYSTEM DOCKING TARGET AUGMENTATION FOR AUTOMATED DOCKING

[75] Inventors: Richard T. Howard, Huntsville; Richard W. Dabney, Toney; Thomas C. Bryan, Huntsville, all of Ala.

[73] Assignee: The United States of America as represented by the Administrator of the National Aeronautics and Space Administration, Washington, D.C.

[21] Appl. No.: 481,538

[22] Filed: Feb. 20, 1990

[51] Int. Cl.$^5$ .............................................. G02B 5/122
[52] U.S. Cl. ...................................... 350/102; 350/97; 350/107
[58] Field of Search ............... 350/102, 103, 107, 113, 350/97, 98; 33/264; 116/28 R, 35 R, 29, 36; 356/153, 399; 273/360

[56] References Cited

U.S. PATENT DOCUMENTS

| | | | |
|---|---|---|---|
| 4,223,980 | 9/1980 | Shafar | 350/97 |
| 4,256,366 | 3/1981 | Buckelew | 350/97 |
| 4,299,442 | 11/1981 | Buckelew | 350/97 |

Primary Examiner—Bruce Y. Arnold
Assistant Examiner—Loha Ben
Attorney, Agent, or Firm—Robert L. Broad, Jr.; Jerry L. Seemann

[57] ABSTRACT

A docking target is provided for use in automated docking of a first vehicle on which the target is located. The target comprising a pair of laterally extending arm portions lying in substantially the same plane and a central post extending outwardly from the plane of the arm portions. At least three reflectors are located on the target, two of the reflectors being located at the outboard ends of the arm portions and another reflector being located at the end of the central post. In an important embodiment, the reflectors comprise individual pieces of retroreflective tape. The reflectors, when viewed from the front of the target, are aligned along the longitudinal center line of the target, and can take a number of different shapes including circular or square.

20 Claims, 1 Drawing Sheet

STANDARD REMOTE MANIPULATOR SYSTEM DOCKING TARGET AUGMENTATION FOR AUTOMATED DOCKING

ORIGIN OF THE INVENTION

The invention described herein was made by an employee(s) of the United States Government and may be manufactured and used by or for the Government for Government purposes without the payment of any royalties thereon or therefor.

CROSS REFERENCE TO RELATED APPLICATION

This application discloses subject matter in common with concurrently filed, commonly assigned, application Ser. No. 07/481,537, entitled "CLOSED-LOOP AUTONOMOUS DOCKING SYSTEM".

1. Field of the Invention

The present invention relates to targets used in docking spacecraft, and more particularly to improvements in a standard remote manipulator system docking target which enable automated docking.

2. Background Art

Present day docking systems use a standard Remote Manipulator System (RMS) docking target for man-controlled teleoperation of robotic systems in guiding the movements of a grapple mechanism, for example, in order to provide docking of an active (chase) vehicle to a passive (target) vehicle. Other systems use different targets and, for example, mirrored glass corner-cube reflectors are used in another, conventional docking system employing radar and using laser light. In addition, active targets (e.g., targets employing lights) having a similar configuration to that of the RMS docking target have also been used in the prior art.

Each of these targets suffers certain disadvantages. For example, at present, the standard RMS target can only be used by humans in tele-robotic operations and cannot be used with an automated system. Further, the laser docking radar system target employs a different target arrangement or pattern which can only be used with the associated laser docking system. In addition, among other disadvantages of active targets, such targets are useless if the target vehicle is without power to operate the active target.

SUMMARY OF THE INVENTION

The present invention concerns an improvement in a standard remote manipulator system docking target (RMS target) referred to above. Such targets comprise laterally extending arm portions and a central post extending outwardly from the plane of the arm portions from the center of the target, and the improvement in accordance with the present invention, concerns the provision of at least three individual reflective areas on the target for enabling use of the target by an automated docking system, two of the reflective areas being located at the outboard ends of the arm portions and another reflective area being located at the free end of the central post.

In accordance with an important aspect of the invention, the reflective areas preferably comprise pieces of retroreflective tape affixed to the target. Preferably, the reflective areas or pieces of tape, as viewed from the front of the target, are in alignment along the longitudinal center line of the target. The pieces of tape can take a number of different shapes, and can, for example, be circular or rectangular in shape. In one embodiment, one of the pieces of tape is different in size from at least one of the other pieces. In a further embodiment not employing pieces of retroreflective tape, the reflective areas comprise corner cube reflectors.

Because the standard RMS target is the present benchmark or standard used in tele-operated docking operations, an important advantage of the invention is that the reflector additions to the RMS target provided in accordance with the invention do not affect normal use of the target, i.e., use by a human operator in a standard piloted docking operation. Accordingly, the human operator can assume command of a docking operation in a situation wherein the automated docking system fails. Moreover, the simplicity of the invention makes it possible to modify existing vehicles designed for orbit, which characteristically carry the standard RMS target, with minimum effort and impact, while still equipping the vehicles for automated docking.

Other features and advantages of the invention will be set forth in, or apparent from, the following detailed description of preferred embodiments of the invention.

BRIEF DESCRIPTION OF THE PREFERRED EMBODIMENTS

Before considering the preferred embodiment of the invention, it is noted that although the present invention is obviously not limited to use with such a system, the invention is particularly adapted for use as a passive target with an autonomous docking system of the type disclosed in the concurrently filed, commonly owned application (Ser. No. 07/481,537) to which reference was made above. As described in that application, data obtained from light reflected from the target is used in providing automated docking of an active (chase) vehicle onto a passive (target) vehicle on which a standard remote manipulator system docking target, as augmented in accordance with the present invention, would be affixed. The manner in which the light reflected from the different areas of the target is used in providing automated docking of the vehicle is fully described in that application and that description will not be repeated here, except to point out that light reflected from the additional reflectors or reflective areas provided in accordance with the invention provides additional positioning data as to the relative positions and attitudes of the target and chase vehicle needed to provide automated docking of the vehicle.

Figure 1:
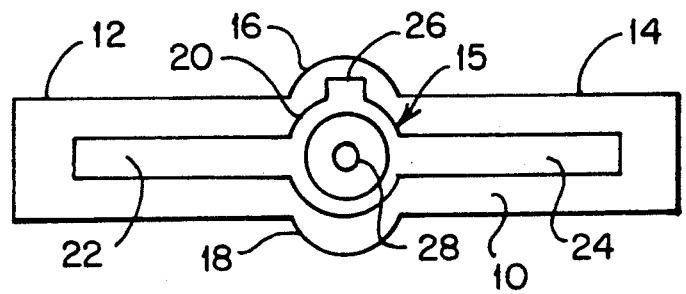
FIG. 1 is a front view of a standard remote manipulator system docking target.
Figure 2:
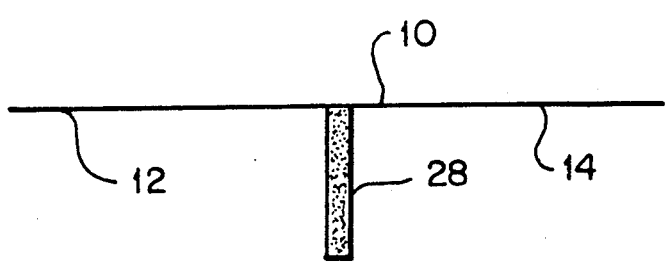
FIG. 2 is a top view of the target of FIG. 1.
Figure 3:
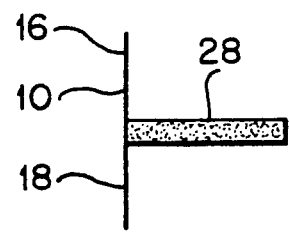
FIG. 3 is a side view of the target of FIG. 1.

Referring first to FIGS. 1 to 3, a standard remote manipulator docking target (RMS target) is shown. As illustrated, the target includes a planar base portion 10 containing a target pattern which comprises a pair of laterally extending arms 12 and 14 and a central area 15 from which extend upward and downward generally semicircular portions 16 and 18. The central area 15 also includes a central circle or circular indicia 20 from which arm portions 22 and 24 extend outwardly from opposite sides thereof, and from where a squared off or rectangular portion 26 extends from the top. A central post 28 is located in the center of circle 20 and extends outwardly from the plane of base portion 10 as illustrated in FIGS. 2 and 3. The dimensions of the target are as follows: length between the ends of arms 12 and 14, 16 inches; width of arms 12 and 14, 2 inches; width between the tips of semi-circular portions 16 and 18, 4 inches; length of post 28, 4 inches.

Figure 4:
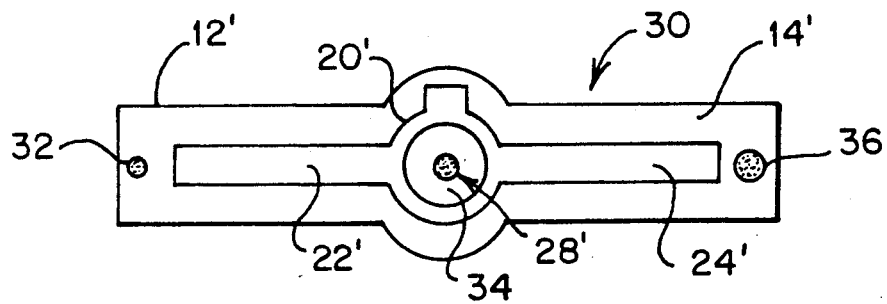
FIG. 4 is a front view of a target corresponding to that of FIG. 1 which has been modified or augmented in accordance with one preferred embodiment of the invention.

Referring to FIG. 4, an RMS target corresponding to that shown in FIGS. 1 to 3 is modified in accordance with the invention. The target of FIG. 4 is similar to that of FIGS. 1 to 3 and corresponding components or elements have been given the same reference numerals with primes attached. As illustrated, the target of FIG. 4, which is generally denoted 30, has added thereto three relatively small pieces or spots of retroreflective tape denoted 32, 34 and 36. In particular, as shown, piece 32 is located at the outboard end of arm 12' outboard of arm portion 22', piece 34 is affixed to the distal end of post 28' and piece 36, which is somewhat larger than the other two pieces, is located at the outboard end of arm 14' outboard of arm portion 24'. Pieces 32, 34 and 36 are each located on the longitudinal centerline of the target 30, although piece 34 is, of course, disposed at the end of post 28' out of the plane of the other two pieces or spots.

Figure 5:
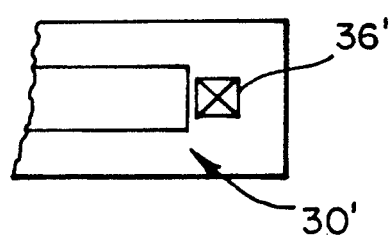
FIGS. 5 and 6 are front views of a portion of targets corresponding to that of FIG. 4 showing two further embodiments of the invention.
Figure 6:
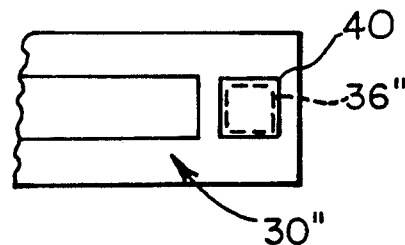

Although retroreflective tape is used in the preferred embodiment of the invention, because of the simplicity of such an approach, individual corner cube reflectors could be used in place of the pieces of tape 32, 34 and 36 of FIG. 4. This is illustrated in FIG. 5 which shows a corner cube reflector 36'. Further, it is to be understood that the reflectors can be made of different shapes or sizes, with the shapes including, e.g., squares (as indicated by the piece of reflector tape 36" of FIG. 6), rectangles, ovals (ellipses) or some combination thereof. Further, an arrangement of reflectors in combination with narrow wavelength filters (one of which, denoted 40, is indicated in FIG. 6) placed over the reflectors can be used to improve the signal-to-noise ratio of the reflections from the target.

It is noted that three retroreflective pieces or areas is a minimum requirement for the automated docking system discussed above to enable derivation of all six error signals used in the docking process. An additional piece or area could be used to provide complete information or knowledge as to the orientation, i.e., right-side-up versus upside-down. However, it will be understood that if one of the outer pieces of tape is larger than the other, the orientation can be determined without the addition of a fourth piece of tape.

As discussed above, the standard RMS target is the present standard for tele-operated docking, and it will be appreciated that one important advantage of the invention is that the additions to the standard target made in accordance with the invention do not affect the usability of the target by humans, i.e., by a pilot, in a standard docking operation. Thus, the target enables a human operator to take over a docking maneuver if the automated system fails. Further, because the standard RMS target is placed on most things that go into orbit, any negative impact of the invention on future space flights is minimum, whereas, on the distinctly positive side, the invention permits automated or manned docking to a single target.

Although the present invention has been described relative to specific exemplary embodiments thereof, it will be understood by those skilled in the art that variations and modifications can be effected in these exemplary embodiments without departing from the scope and spirit of the invention.

What is claimed is:

1. A docking target for use in automated docking of a first vehicle to a vehicle on which the target is located, said target comprising a pair of laterally extending arm portions lying in substantially the same plane and a central post extending outwardly from the plane of said arm portions, and at least three reflectors located on said target, two of said reflectors being located at the outboard ends of said arm portions and another reflector being located at the end of said central post.

2. A docking target as claimed in claim 1, wherein said reflectors, when viewed from the front of the target, are aligned along the longitudinal center line of the target.

3. A docking target as claimed in claim 1, wherein said reflectors comprise individual pieces of retroreflective tape.

4. A docking target as claimed in claim 3, wherein said pieces of retroreflective tape are circular in shape.

5. A docking target as claimed in claim 3, wherein said pieces of retroreflective tape are rectangular in shape.

6. A docking target as claimed in claim 5, wherein said pieces of retroreflective tape are square in shape.

7. A docking target as claimed in claim 1, wherein said reflectors comprise corner cube reflectors.

8. A docking target as claimed in claim 1, wherein one of said reflectors is of different size than at least one other reflector.

9. A docking target as claimed in claim 1, wherein said target includes a central circular portion further including oppositely laterally extending portions, said reflectors located at the outboard ends of said arm portions being disposed outwardly of said laterally extending portions, and said central post being located at the center of said circular portion.

10. A docking target as claimed in claim 1, wherein narrow wavelength filters are placed over the reflectors to improve the signal-to-noise ratios of reflections from the target.

11. In a standard remote manipulator system docking target comprising laterally extending arm portions and a central post extending outwardly from the plane of said arm portions from the center of the target, the improvement comprising at least three individual reflective areas provided on said target for enabling use of said target by an automated docking system, two of said reflective areas being located at the outboard ends of said arm portions and the third reflective area being located at the free end of said central post.

12. A target as claimed in claim 11, wherein said reflective areas, as viewed from the front of the target, are in alignment along the longitudinal center line of said target.

13. A target as claimed in claim 12, wherein said areas comprise pieces of retroreflective tape affixed to said target.

14. A target as claimed in claim 13, wherein said pieces of tape are circular in shape.

15. A target as claimed in claim 13, wherein one of said pieces of tape is different in size from the other pieces.

16. A target as claimed in claim 11, wherein said pieces of tape are rectangular in shape.

17. A target as claimed in claim 16, wherein said pieces of tape are square in shape.

18. A target as claimed in claim 11, wherein said reflective areas comprise corner cube reflectors.

19. A target as claimed in claim 11, wherein one of said reflectors is of different size than at least one other reflector.

20. A target as claimed in claim 11, wherein narrow wavelength filters are placed over the reflective areas to improve the signal-to-noise ratios of reflections from the target.

* * * * *